United States Patent
Jafari Tafti et al.

(10) Patent No.: US 12,128,924 B2
(45) Date of Patent: Oct. 29, 2024

(54) SYSTEM AND METHOD FOR EFFICIENT PLANNING UNDER UNCERTAINTY FOR AUTONOMOUS VEHICLES

(71) Applicant: GM Global Technology Operations LLC, Detroit, MI (US)

(72) Inventors: Sayyed Rouhollah Jafari Tafti, Troy, MI (US); Brent Navin Roger Bacchus, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 296 days.

(21) Appl. No.: 17/933,587

(22) Filed: Sep. 20, 2022

(65) Prior Publication Data
US 2024/0092384 A1 Mar. 21, 2024

(51) Int. Cl.
*B60W 60/00* (2020.01)
*G05D 1/00* (2006.01)

(52) U.S. Cl.
CPC ....... *B60W 60/0011* (2020.02); *G05D 1/0088* (2013.01); *G05D 1/0212* (2013.01)

(58) Field of Classification Search
CPC ......... B60W 60/0011; B60W 60/0027; B60W 2050/0004; B60W 2050/0028; G05D 1/0088; G05D 1/0212
See application file for complete search history.

(56) References Cited

U.S. PATENT DOCUMENTS

| | | | |
|---|---|---|---|
| 2021/0276595 A1* | 9/2021 | Casas | G06V 30/19173 |
| 2022/0048503 A1* | 2/2022 | Khandelwal | B60W 30/0956 |
| 2022/0126445 A1* | 4/2022 | Zhu | B25J 9/1635 |
| 2022/0185334 A1* | 6/2022 | Bae | B60W 60/0011 |

* cited by examiner

*Primary Examiner* — Khoi H Tran
*Assistant Examiner* — Nhi Q Bui
(74) *Attorney, Agent, or Firm* — Vivacqua Crane, PLLC

(57) ABSTRACT

A method for efficient autonomous driving planning includes receiving a current driving-scene data and a predicted driving-scene data. The current driving-scene data is indicative of a current driving scene around a host vehicle. The predicted driving-scene data is indicative of a predicted driving scene around the host vehicle. The predicted driving scene around the host vehicle is different from the current driving scene around the host vehicle. The method further includes converting the current driving-scene data and the predicted driving-scene data into a first scene-graph and a second scene-graph, respectively. The method further includes determining a plurality of scene change metrics using the first scene-graph and the second scene-graph. The method further includes selecting between a first trajectory planning process and a second trajectory planning process based on the plurality of scene change metrics.

20 Claims, 2 Drawing Sheets

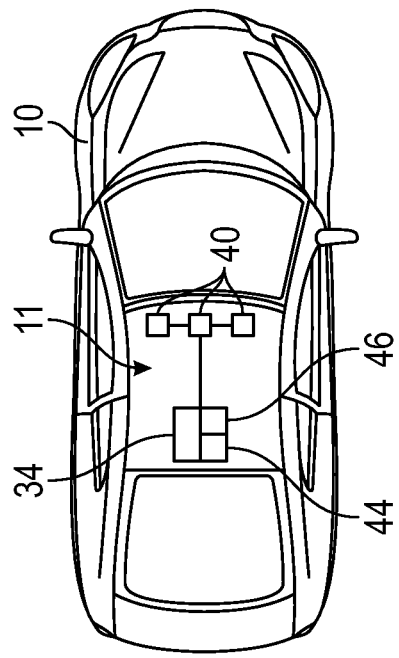
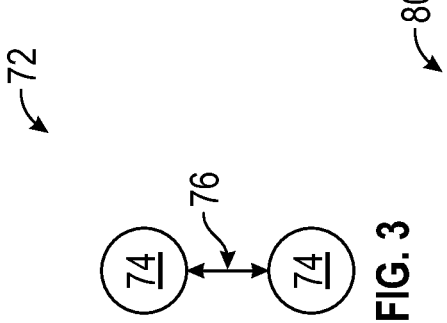
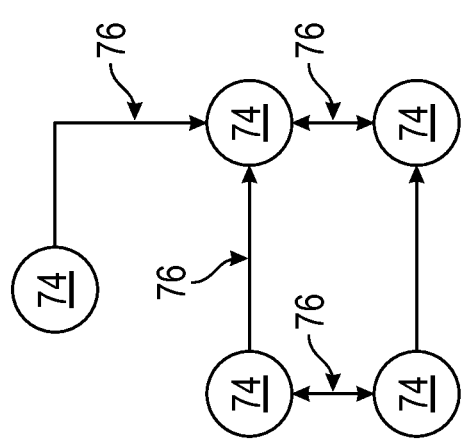
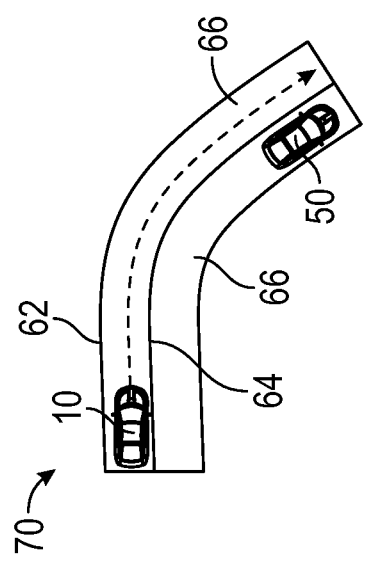
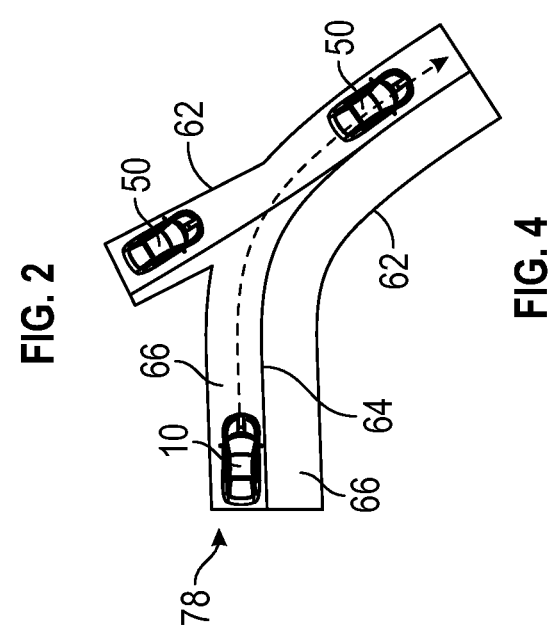

SYSTEM AND METHOD FOR EFFICIENT PLANNING UNDER UNCERTAINTY FOR AUTONOMOUS VEHICLES

INTRODUCTION

The present disclosure relates to autonomous vehicles and, more particularly, to systems and methods for efficient trajectory planning under uncertainty for autonomous vehicles.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Currently, trajectory planning approaches for autonomous vehicles may be computationally expensive when required to run at a high, fixed rate. What's more, uncertainty as to the scene around the autonomous vehicle may increase the computational resource necessary for planning the most appropriate trajectory. Because trajectory planning for autonomous vehicles may be computationally expensive, it is desirable to develop systems and methods for efficient trajectory planning under scene uncertainty.

SUMMARY

The present disclosure describes a method for efficient trajectory planning under scene uncertainty. In an aspect of the present disclosure, the method for efficient autonomous driving planning includes receiving a current driving-scene data and a predicted driving-scene data. The current driving-scene data is indicative of a current driving scene around a host vehicle. The predicted driving-scene data is indicative of a prior driving scene around the host vehicle predicted to the current time based on sensor data collected at an earlier time. The predicted driving scene around the host vehicle is different from the current driving scene around the host vehicle. The current driving-scene data is part of sensor data collected by sensors of a host vehicle at a first time, and the predicted driving-scene data is part of sensor data collected by sensors of the host vehicle at a second time, which is earlier than the first time (e.g., one second earlier). The method further includes converting the current driving-scene data and the predicted driving-scene data into a first scene-graph and a second scene-graph, respectively. The method further includes determining a plurality of scene change metrics using the first scene-graph and the second scene-graph. The method further includes selecting between a first trajectory planning process and a second trajectory planning process based on the plurality of scene change metrics. The first trajectory planning process uses more computational resources than the second trajectory planning process. The method further includes commanding the host vehicle to autonomously drive according to a trajectory determined by a selected one of the first trajectory planning process or the second trajectory planning process. The method described in this paragraph improves autonomous driving technology by minimizing the computer resources necessary to plan a trajectory for an autonomous vehicle.

In an aspect of the present disclosure, the plurality of scene change metrics includes a graph edit distance between the first scene-graph and the second scene-graph. Determining the plurality of scene change metrics using the current driving-scene data and the predicted driving-scene data includes determining the graph edit distance between the first scene-graph and the second scene-graph. Selecting between the first trajectory planning process and the second trajectory planning process based on the plurality of scene change metrics includes selecting between the first trajectory planning process and the second trajectory planning process based on the graph edit distance between the first scene-graph and the second scene-graph.

In an aspect of the present disclosure, the graph edit distance between the first scene-graph and the second scene-graph may be calculated, for example, using the following equation:

$$GED(g_0, g_t) = \min_{(e_1 \ldots e_k) \in P(g_0, g_1)} \sum_{i=1}^{k} c(e_i)$$

where:
  $P(g_0, g_1)$ is a set of edit paths transforming $g_0$ into (a graph isomorphic to) $g_1$;
  $c(e)$ is greater or equal to zero and is a cost of edit graph operation e;
  e is an edit graph operation;
  i is a number of edit graph operations;
  k is a maximum number of edit graph operations;
  $g_0$ is the first scene-graph;
  $g_t$ is the second scene-graph; and
  $GED(g_0, g_1)$ is the graph edit distance between the first scene-graph and the second scene-graph.

In an aspect of the present disclosure, the plurality of scene change metrics includes a Mahalanobis distance between a predicted position of a remote actor, such as a remote vehicle and/or a vulnerable road user, and a current position of the remote actor. The predicted position of the remote actor is part of the predicted driving-scene data. The current position of the remote actor is part of the current driving-scene data. Determining the plurality of scene change metrics using the current driving-scene data and the predicted driving-scene data includes determining the Mahalanobis distance between the predicted position of the remote actor and the current position of the remote actor. Selecting between the first trajectory planning process and the second trajectory planning process based on the plurality of scene change metrics includes selecting between the first trajectory planning process and the second trajectory planning process based on the Mahalanobis distance between the predicted position of the remote actor and the current position of the remote actor.

In an aspect of the present disclosure, the Mahalanobis distance between the predicted position of the remote actor and the current position of the remote actor may be calculated, for example, using the following equation:

$$d_i^2 = (p_i - q_i)^T (\Sigma_{p_i} + \Sigma_{q_i})^{-1} (p_i - q_i)$$

where:
  $d_i$ is the Mahalanobis distance between the predicted position of the remote actor i and the current position of the remote actor i;
  i is the remote actor;
  $p_i$ is the predicted position of the remote actor i;
  $q_i$ is the current position of the remote actor i;
  $\Sigma_{p_i}$ is an error covariance of the predicted position $p_i$ of the remote actor i;
  $\Sigma_{q_i}$ is an error covariance of the current position $q_i$ of the remote actor i; and
  T is a transpose operator which flips a matrix over a diagonal thereof.

In an aspect of the present disclosure, the plurality of scene change metrics includes a target lane shape. Determining the plurality of scene change metrics using the current driving-scene data and the predicted driving-scene data includes determining the target lane shape. Selecting between the first trajectory planning process and the second trajectory planning process based on the plurality of scene change metrics includes selecting between the first trajectory planning process and the second trajectory planning process based on the target lane shape.

In an aspect of the present disclosure, the target lane shape may be calculated using, for example, the following equation:

$$TLS = \max_s |l_t(s) - l_0(s)|$$

where:
- $l_t(s)$ are coordinates of a lane center trajectory in the current driving scene;
- $l_0(s)$ are coordinates of the lane center trajectory in the predicted driving scene;
- s is a station value along a lane segment; and
- TLS is the target lane shape.

In an aspect of the present disclosure, the method further includes determining a sum of weighted scene change metrics.

In an aspect of the present disclosure, the sum of weighted scene change metrics is calculated according to the following equation:

$$SWM = w_1 d_i + w_2 GED(g0, g1) + w_3 TLS$$

where:
- SWM is the sum of weighted scene change metrics;
- $GED(g_0, g_1)$ is the graph edit distance between the first scene-graph and the second scene-graph;
- $d_i$ is the Mahalanobis distance between the predicted position of the remote actor i and the current position of the remote actor i;
- TLS is the target lane shape;
- $w_1$ is a first weighting factor;
- $w_2$ is a second weighting factor; and
- $w_3$ is a third weighting factor.

In an aspect of the present disclosure, the method further includes determining whether the sum of the weighted scene metrics is greater than a predetermined threshold.

In an aspect of the present disclosure, selecting between the first trajectory planning process and the second trajectory planning process based on the plurality of scene change metrics includes selecting the first trajectory planning process in response to determining that the sum of the weighted scene metrics is greater than the predetermined threshold.

In an aspect of the present disclosure, selecting between the first trajectory planning process and the second trajectory planning process based on the plurality of scene change metrics includes selecting the second trajectory planning process in response to determining that the sum of the weighted scene metrics is not greater than the predetermined threshold.

The present disclosure also describes a tangible, non-transitory, machine-readable medium, including machine-readable instructions, that when executed by one or more processors, cause one or more processors to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein:

FIG. 1 is a schematic diagram of a host vehicle including a system for efficient trajectory planning under scene uncertainty;

FIG. 2 is a schematic top view of a predicted driving scene;

FIG. 3 is a first scene-graph indicative of the predicted driving scene of FIG. 2;

FIG. 4 is a schematic top view of a current driving scene;

FIG. 5 is a second scene-graph indicative of the current driving scene of FIG. 4.

DETAILED DESCRIPTION

Figure 6:
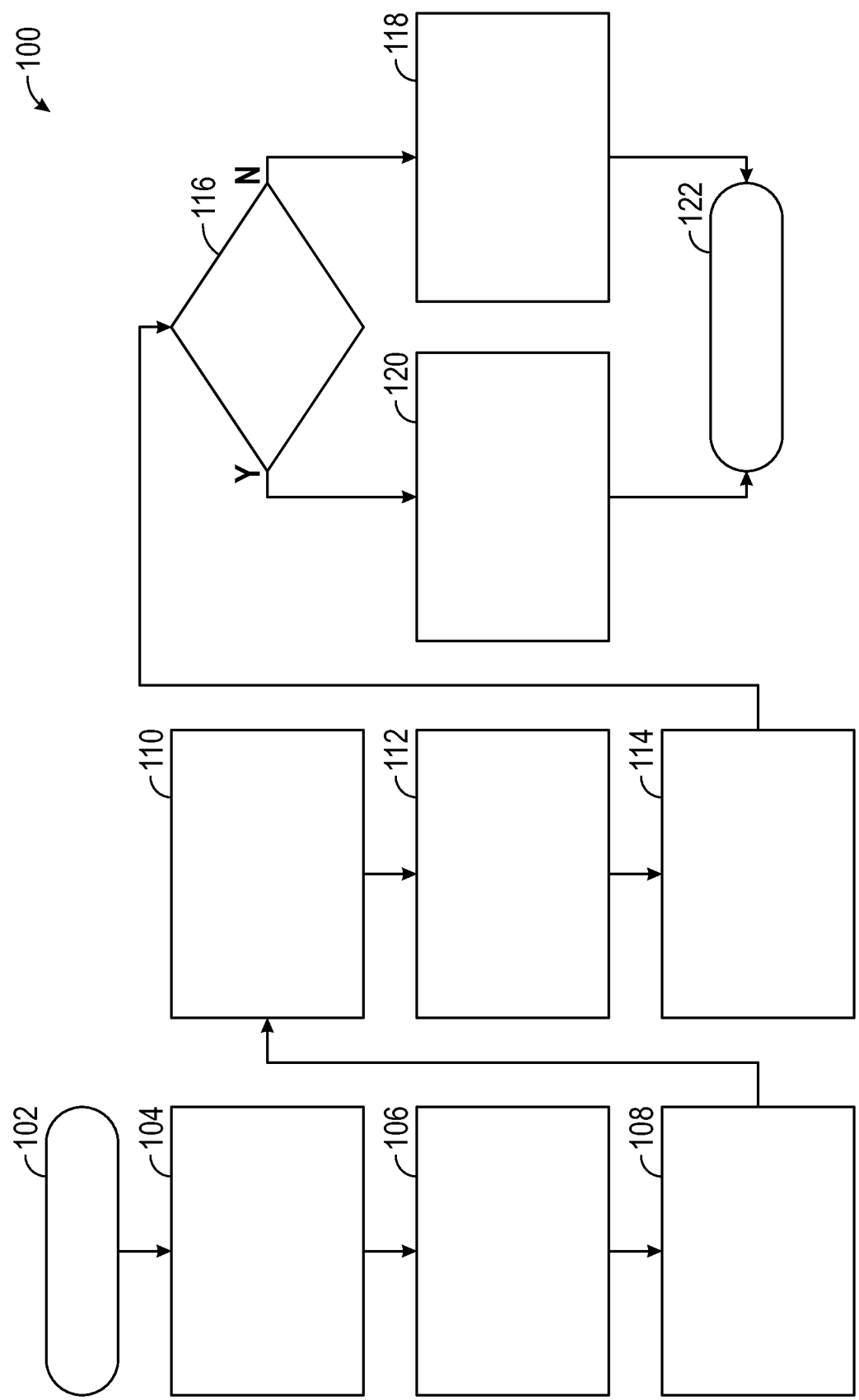
FIG. 6 is a flowchart of a method system for efficient trajectory planning under scene uncertainty.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a host vehicle 10 includes (or is in communication with) a system 11 for efficient trajectory planning. While the system 11 is shown inside the host vehicle 10, it is contemplated that the system 11 may be outside of the host vehicle 10. As a non-limiting example, the system 11 may be a cloud-based system in wireless communication with the host vehicle 10. Although the host vehicle 10 is shown as a sedan, it is envisioned that that host vehicle 10 may be another type of vehicle, such as a pickup truck, a coupe, a sport utility vehicle (SUVs), a recreational vehicle (RVs), etc. Irrespective of the type of vehicle, the host vehicle 10 is an autonomous vehicle configured to drive autonomously.

The system 11 includes a system controller 34 and one or more sensors 40 in communication with the system controller 34. The sensors 40 collect information and generate sensor data indicative of the collected information. As non-limiting examples, the sensors 40 may include Global Positioning System (GPS) transceivers, yaw sensors, speed sensors, lidars, radars, and forward-facing cameras, among others. The GPS transceivers are configured to detect the location of the host vehicle 10. The speed sensors are configured to detect the speed of the host vehicle 10. The yaw sensors are configured to determine the heading of the host vehicle 10. The cameras have a field of view large enough to capture images of the roadways 62 (FIG. 2) in front of the host vehicle 10. For example, the cameras are configured to capture images of the lane lines 64 (FIG. 2) of the roadway 62 in front of the host vehicle 10.

The system controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the system controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media of the system controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the system controller 34 in controlling the host vehicle 10.

The instructions may include one or more separate programs, each of which comprises an ordered listing of executable instructions for implementing logical functions. The instructions, when executed by the processor 44, receive and process signals from the sensors 40, perform logic, calculations, methods and/or algorithms for automatically controlling the components of the host vehicle 10, and generate control signals to the actuators to automatically control the components of the host vehicle 10 based on the logic, calculations, methods, and/or algorithms. Although a single system controller 34 is shown in FIG. 1, the system 11 may include a plurality of system controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the system controller 34 are embodied in the system 11. The non-transitory computer readable storage device or media 46 includes machine-readable instructions (shown, for example, in FIG. 6), that when executed by the one or more processors, cause the processors 44 to execute the method 100 (FIG. 6).

As discussed in detail below, the system 11 is configured to minimize the computational power needed in autonomous vehicle applications. Given a set of trajectory planning algorithms of varying complexities, the system 11 may determine when a light-weight trajectory planning approach is suitable based on measures of the scene complexity and re-assessment of prior assumptions. Alternatively, the system 11 may automatically determine when it is necessary to perform a full trajectory replan by measuring changes to the scene and re-evaluating assumptions. In doing so, the system 11 saves energy and computational resources without requiring significant changes to the trajectory planning algorithms.

With reference to FIGS. 2 and 3, during autonomous driving, the host vehicle 10 may be driving on a predicted driving scene 70 as shown in FIG. 2. In the present disclosure, the term "driving scene" means the environment around the host vehicle 10 and includes the static and dynamic objects around the host vehicle 10 (e.g., 20 feet around the host vehicle 10). The static and dynamic objects around the host vehicle 10 may include, but are not limited to, remote vehicles 50, the roadways 62, the lanes 66 in the roadways 62, the lane lines 64 of the roadways, etc. The sensors 20, such as cameras and lidars, may detect the current driving scene 70 and send the predicted driving-scene data, which is indicative of the predicted driving scene 70, to the system controller 34. As discussed below, the system controller 34 converts the current driving-scene data into a first scene-graph 72 (FIG. 3). In the first scene-graph 72 (FIG. 3), the nodes 74 represent the road's lane segments with attributes such as the lengths of the lane segments, the positions of the remote vehicles 50, the position of the signs, etc. The edges 76 between the nodes 74 represent, among other things, connectivity type between lane segments such as adjacent, merge, split, etc.

With reference to FIGS. 4 and 5, at the current time, the sensors 20 of the host vehicle 10 may detect a different driving scene from what was predicted in an earlier time (i.e., the current driving scene 78). The current driving scene 78 is different from the predicted driving scene 70 (FIG. 2). For example, the current driving scene 78 may include more or fewer remote vehicles 50 and may include more lanes 66 merging into the roadway 62. The sensors 20, such as cameras and lidars, may detect the current driving scene 78 and send the current driving-scene data, which is indicative of the current driving scene 78, to the system controller 34. The system controller 34 converts the predicted driving-scene data into a second scene graph 80 (FIG. 5). In the second scene-graph 80 (FIG. 5), the nodes 74 represent road's lane segments with attributes such as the lengths of the lane segments, the positions of the remote vehicles 50, the position of the signs, etc. The edges 76 between the nodes 74 represent, among other things, connectivity type between lane segments such as adjacent, merge, split, etc. The first scene-graph 72 and the second scene-graph 80 (FIG. 5) are used in the method 100 for efficient trajectory planning.

FIG. 6 is a flowchart of a method 100 for efficient trajectory planning. The method 100 begins at block 102. Then, the method 100 proceeds to block 104. At block 104, the system controller 34 receives data from one or more sensors 20 at a first time and a second time, which is earlier than the first time (e.g., one second earlier). The data received from the sensors 20 (i.e., sensor data) includes the current driving-scene data and the predicted driving-scene data. As discussed above, the current driving-scene data is indicative of the current driving scene 70 around the host vehicle 10, and the predicted driving-scene data is indicative of the predicted driving scene 78 around the host vehicle 10 based on sensor data collected at an earlier time. The predicted driving scene 78 around the host vehicle 10 is different from the current driving scene 70 around the host vehicle 10. Then, the method 100 continues to block 106.

At block 106, the system controller 34 converts the current driving-scene data and the predicted driving-scene data into the first scene-graph 72 and the second scene-graph 80, respectively. In the first scene-graph 72 (FIG. 3) and the second scene-graph 80 (FIG. 5), the nodes 74 represent road's lane segments with attributes such as the lengths of the lane segments, the positions of the remote vehicles 50, the position of the signs, etc. The edges 76 between the nodes 74 represent, among other things, connectivity type between lane segments such as adjacent, merge, split, etc. Next, the method 100 continues to block 108.

At block 108, the system controller 34 determines one of a plurality of scene change metrics using the first scene-graph 72 and the second scene-graph 80. Specifically, at block 108, the system controller 34 determines a graph edit distance between the first scene-graph 72 and the second scene-graph 80. As a non-limiting example, the system controller 34 may determine the graph edit distance between the first scene-graph 72 and the second scene-graph 80 using the following equation:

$$GED(g_0, g_t) = \min_{(e_1 \ldots e_k) \in P(g_0, g_1)} \sum_{i=1}^{k} c(e_i) \qquad \text{Equation 1}$$

where:
- $P(g_0, g_1)$ is a set of edit paths transforming $g_0$ into (a graph isomorphic to) $g_1$;
- $c(e)$ is greater or equal to zero and is the cost of edit graph operation e;
- e is an edit graph operation;
- i is the number of edit graph operations;
- k is the maximum number of edit graph operations;
- $g_0$ is the first scene-graph;
- $g_t$ is the second scene-graph; and
- $GED(g_0, g_1)$ is the graph edit distance between the first scene-graph and the second scene-graph.

Then, the method 100 continues to block 110.

At block 110, the system controller 34 determines another scene change metric using the first scene-graph 72 and the second scene-graph 80. Specifically, at block 110, the system controller 34 determines a Mahalanobis distance between a predicted position of a remote actor (e.g., one or more remote vehicles 50) and a current position of the remote actor. The predicted position of the remote actor is part of the predicted driving-scene data, and the current position of the remote actor is part of the current driving-scene data. As non-limiting examples, the remote actor may be one of the remote vehicles 50 and/or a vulnerable road user (VRU). To determine the Mahalanobis distance between the predicted position of the remote actor and the current position of the remote actor, the system controller 34 may, for example, use the following equation:

$$d_i^2 = (p_i - q_i)^T (\Sigma_{p_i} + \Sigma_{q_i})^{-1} (p_i - q_i) \qquad \text{Equation 2}$$

where:
- $d_i$ is the Mahalanobis distance between the predicted position of the remote actor and the current position of the remote actor i;
- i is the remote actor;
- $p_i$ is the predicted position of the remote actor i;
- $q_i$ is the current position of the remote actor i;
- $\Sigma_{p_i}$ is an error covariance of the predicted position $p_i$ of the remote actor i;
- $\Sigma_{q_i}$ is an error covariance of the current position $q_i$ of the remote actor i; and
- T is a transpose operator which flips a matrix over a diagonal thereof.

Then, the method 100 proceeds to block 112.

At block 112, the system controller 34 determines another scene change metric using the first scene-graph 72 and the second scene-graph 80. Specifically, at block 112, the target lane shape using the first scene-graph 72 and the second scene-graph 80. To do so, the system controller 34 may use the following equation:

$$TLS = \max_s |l_t(s) - l_0(s)| \qquad \text{Equation 3}$$

where:
- $l_t(s)$ are coordinates of a lane center trajectory in the current driving scene;
- $l_0(s)$ are coordinates of the lane center trajectory in the predicted driving scene;
- s is a station value along a lane segment; and
- TLS is the target lane shape.

Then, the method 100 continues to block 114. At block 114, the system controller 34 determines the sum of the weighted scene change metrics (i.e., the target lane shape, the Mahalanobis distance, and the graph edit distance discussed above). To do so, the system controller 34 may use the following equation:

$$SWM = w_1 d_i + w_2 GED(g0, g1) + w_3 TLS$$

where:
- SWM is the sum of the weighted scene metrics;
- $GED(g_0, g_1)$ is the graph edit distance between the first scene-graph and the second scene-graph;
- $d_i$ is the Mahalanobis distance between the predicted position of the remote actor and the current position of the remote actor i; TLS is the target lane shape;
- $w_1$ is a first weighting factor;
- $w_2$ is a second weighting factor; and
- $w_3$ is a third weighting factor.

The first weighting factor $w_1$, the second weighting factor $w_2$, and the third weighting factor $w_3$ may be determined by testing the host vehicle 10. Then, the method 100 continues to block 116.

At block 116, the system controller 34 determines whether the sum of the weighted scene metrics is greater than a predetermined threshold. The predetermined threshold may be determined by testing the host vehicle 10. If the sum of the weighted scene metrics is not greater than a predetermined threshold, then the method 100 proceeds to block 118.

At block 118, the system controller 34 selects a second trajectory planning process to adjust the trajectory of the host vehicle 10 in view of the change in the driving scene. As a non-limiting example, the second trajectory planning process may use an odometry-base compensation method to determine the autonomous trajectory of the host vehicle 10. Also, at block 118, the system controller 34 commands the host vehicle 10 to autonomously drive according to the trajectory determined by the second trajectory planning process. Then, the method 100 continues to block 122. At block 122, the method 100 ends.

Returning to block 116, if the sum of the weighted scene metrics is greater than the predetermined threshold, then the method 100 proceeds to block 120. At block 120, the system controller 34 selects a first trajectory planning process to adjust the trajectory of the host vehicle 10 in view of the change in the driving scene. As a non-limiting example, the first trajectory planning process may use a cost graph approach to determine the autonomous trajectory of the host vehicle 10. Also, at block 118, the system controller 34 commands the host vehicle 10 to autonomously drive according to the trajectory determined by the first trajectory planning process. The first trajectory planning process uses more computational resources than the second trajectory planning process. Then, the method 100 continues to block 122. At block 122, the method 100 ends.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations. "Current driving scene" is the best estimate of the scene at the current time, given all inputs (e.g., perception) available from the past up to the current time t. The current driving scene may be expressed in either ego-frame (i.e., relative to the ego vehicle) or in some other frame (e.g., global/world frame, using latitude and longitude coordinates). "Predicted driving scene" is the best estimate of the scene at some time to in the past, given all inputs available up to time to, then predicted forward to time t. The prediction step involves potentially updating the reference frame (if the scene is in ego-frame) and the positions of other vehicles in the scene. In the present disclosure, the term "first trajectory planning process" may be referred to as the computationally expensive trajectory planning process and is an algorithm for planning the trajectory of an autonomous vehicle with high computational complexity (that requires a large number of steps to complete relative to its task input size). In the present disclosure, the term "second trajectory planning process" may be referred to as a computationally cheap trajectory planning process and is an algorithm for planning the trajectory of an autonomous vehicle with low computational complexity (that requires few steps to complete relative to its task input size).

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for efficient autonomous driving planning, comprising:

receiving a current driving-scene data and a predicted driving-scene data, wherein the current driving-scene data is indicative of a current driving scene around a host vehicle, the predicted driving-scene data is indicative of a predicted driving scene around the host vehicle based on sensor data collected at an earlier time, the predicted driving scene around the host vehicle is different from the current driving scene around the host vehicle;

converting the current driving-scene data and the predicted driving-scene data into a first scene-graph and a second scene-graph, respectively;

determining a plurality of scene change metrics using the first scene-graph and the second scene-graph;

selecting between a first trajectory planning process and a second trajectory planning process based on the plurality of scene change metrics, wherein the first trajectory planning process uses more computational resources than the second trajectory planning process; and commanding the host vehicle to autonomously drive according to a trajectory determined by a selected one of the first trajectory planning process or the second trajectory planning process.

2. The method of claim 1, wherein the plurality of scene change metrics includes a graph edit distance between the first scene-graph and the second scene-graph, determining the plurality of scene change metrics using the current driving-scene data and the predicted driving-scene data includes determining the graph edit distance between the first scene-graph and the second scene-graph, and selecting between the first trajectory planning process and the second trajectory planning process based on the plurality of scene change metrics includes selecting between the first trajectory planning process and the second trajectory planning process based on the graph edit distance between the first scene-graph and the second scene-graph.

3. The method of claim 2, wherein determining the graph edit distance between the first scene-graph and the second scene-graph includes calculating the graph edit distance between the first scene-graph and the second scene-graph using a following equation:

$$GED(g_0, g_t) = \min_{(e_1 \ldots e_k) \in P(g_0, g_1)} \sum_{i=1}^{k} c(e_i)$$

where:
- $P(g_0, g_1)$ is a set of edit paths transforming $g_0$ into (a graph isomorphic to) $g_1$;
- $c(e)$ is greater or equal to zero and is a cost of edit graph operation e;
- e is edit graph operations;
- i is a number of edit graph operations;
- k is a maximum number of edit graph operations;
- $g_0$ is the first scene-graph;
- $g_t$ is the second scene-graph; and
- $GED(g_0, g_1)$ is the graph edit distance between the first scene-graph and the second scene-graph.

4. The method of claim 3, wherein the plurality of scene change metrics includes a Mahalanobis distance between a predicted position of a remote actor and a current position of the remote actor, the predicted position of the remote actor is part of the predicted driving-scene data, the current position of the remote actor is part of the current driving-scene data, determining the plurality of scene change metrics using the current driving-scene data and the predicted driving-scene data includes determining the Mahalanobis distance between the predicted position of the remote actor and the current position of the remote actor, and selecting between the first trajectory planning process and the second trajectory planning process based on the plurality of scene change metrics includes selecting between the first trajectory planning process and the second trajectory planning process based on the Mahalanobis distance between the predicted position of the remote actor and the current position of the remote actor.

5. The method of claim 4, wherein determining the Mahalanobis distance between the predicted position of the remote actor and the current position of the remote actor includes calculating the Mahalanobis distance between the predicted position of the remote actor and the current position of the remote actor using a following equation:

$$d_i^2 = (p_i - q_i)^T (\Sigma_{p_i} + \Sigma_{q_i})^{-1} (p_i - q_i)$$

where:
- $d_i$ is the Mahalanobis distance between the predicted position of a remote actor i and the current position of the remote actor i;
- i is the remote actor;
- $p_i$ is the predicted position of the remote actor i;
- $q_i$ is the current position of the remote actor i;
- $\Sigma_{p_i}$ is an error covariance of the predicted position $p_i$ of the remote actor i;
- $\Sigma_{q_i}$ is an error covariance of the current position $q_i$ of the remote actor i; and
- T is a transpose operator which flips a matrix over a diagonal thereof.

6. The method of claim 5, wherein the plurality of scene change metrics includes a target lane shape, determining the plurality of scene change metrics using the current driving-scene data and the predicted driving-scene data includes determining the target lane shape, and selecting between the first trajectory planning process and the second trajectory planning process based on the plurality of scene change metrics includes selecting between the first trajectory planning process and the second trajectory planning process based on the target lane shape.

7. The method of claim 6, wherein determining the target lane shape includes calculating the target lane shape using a following equation:

$$TLS = \max_s |l_t(s) - l_0(s)|$$

where:
- $l_t(s)$ are coordinates of a lane center trajectory in the current driving scene;
- $l_0(s)$ are coordinates of the lane center trajectory in the predicted driving scene; and
- s is a station value along a lane segment;
- TLS is the target lane shape.

8. The method of claim 7, further comprising determining a sum of weighted scene change metrics.

9. The method of claim 8, wherein the sum of weighted scene change metrics is calculated according to a following equation:

$$SWM = w_1 d_i + w_2 GED(g0, g1) + w_3 TLS$$

where:
- SWM is the sum of weighted scene change metrics;
- $GED(g_0, g_1)$ is the graph edit distance between the first scene-graph and the second scene-graph;
- $d_i$ is the Mahalanobis distance between the predicted position of the remote actor i and the current position of the remote actor i;
- TLS is the target lane shape;
- $w_1$ is a first weighting factor;
- $w_2$ is a second weighting factor; and
- $w_3$ is a third weighting factor.

10. The method of claim 9, further comprising determining whether the sum of the weighted scene metrics is greater than a predetermined threshold.

11. The method of claim 10, wherein selecting between the first trajectory planning process and the second trajectory planning process based on the plurality of scene change metrics includes selecting the first trajectory planning process in response to determining that the sum of the weighted scene metrics is greater than the predetermined threshold.

12. The method of claim 10, wherein selecting between the first trajectory planning process and the second trajectory planning process based on the plurality of scene change metrics includes selecting the second trajectory planning process in response to determining that the sum of the weighted scene metrics is not greater than the predetermined threshold.

13. A tangible, non-transitory, machine-readable medium, comprising machine-readable instructions, that when executed by a processor, cause the processor to:

receive a current driving-scene data and a predicted driving-scene data, wherein the current driving-scene data is indicative of a current driving scene around a host vehicle, the predicted driving-scene data is indicative of a predicted driving scene around the host vehicle, the predicted driving scene around the host vehicle is different from the current driving scene around the host vehicle;

convert the current driving-scene data and the predicted driving-scene data into a first scene-graph and a second scene-graph, respectively;

determine a plurality of scene change metrics using the current driving-scene data and the predicted driving-scene data;

select between a first trajectory planning process and a second trajectory planning process based on the plurality of scene change metrics, wherein the first trajectory planning process uses more computational resources than the second trajectory planning process; and command the host vehicle to autonomously drive the host vehicle according to a trajectory determined by a selected one of the first trajectory planning process or the second trajectory planning process.

14. The machine-readable medium of claim 13, wherein the plurality of scene change metrics includes a graph edit distance between the first scene-graph and the second scene-graph, and the machine-readable medium further comprising machine-readable instructions, that when executed by the processor, cause the processors to:

determine the graph edit distance between the first scene-graph and the second scene-graph; and select between the first trajectory planning process and the second trajectory planning process based on the graph edit distance between the first scene-graph and the second scene-graph.

15. The machine-readable medium of claim 14, further comprising machine-readable instructions, that when executed by the processor, cause the processors to:

calculating the graph edit distance between the first scene-graph and the second scene-graph using a following equation:

$$GED(g_0, g_t) = \min_{(e_1 \ldots e_k) \in P(g_0, g_1)} \sum_{i=1}^{k} c(e_i)$$

where:
$P(g_0, g_1)$ is a set of edit paths transforming $g_0$ into (a graph isomorphic to) $g_1$;
c(e) is greater or equal to zero and is a cost of edit graph operation e;
e is an edit graph operation;
i is a number of edit graph operations;
k is a maximum number of edit graph operations;
$g_0$ is the first scene-graph;
$g_t$ is the second scene-graph; and
$GED(g_0, g_1)$ is the graph edit distance between the first scene-graph and the second scene-graph.

16. The machine-readable medium of claim 15, wherein plurality of scene change metrics includes a Mahalanobis distance between a predicted position of a remote actor and a current position of the remote actor, the machine-readable medium further comprising machine-readable instructions, that when executed by the processor, cause the processor to:

determine the Mahalanobis distance between the predicted position of the remote actor and the current position of the remote actor; and select between the first trajectory planning process and the second trajectory planning process based on the Mahalanobis distance between the predicted position of the remote actor and the current position of the remote actor.

17. The machine-readable medium of claim 16, further comprising machine-readable instructions, that when executed by the processor, cause the processors to:

calculate the Mahalanobis distance between the predicted position of the remote actor and the current position of the remote actor using a following equation:

$$d_i^2 = (p_i - q_i)^T (\Sigma_{p_i} + \Sigma_{q_i})^{-1} (p_i - q_i)$$

where:
$d_i$ is the Mahalanobis distance between the predicted position of the remote actor i and the current position of the remote actor i;
i is the remote actor;
$p_i$ is the predicted position of the remote actor i;
$q_i$ is the current position of the remote actor i;
$\Sigma_{p_i}$ is an error covariance of the predicted position $p_i$ of the remote actor i;
$\Sigma_{q_i}$ is an error covariance of the current position $q_i$ of the remote actor i; and
T is a transpose operator which flips a matrix over a diagonal thereof.

18. The machine-readable medium of claim 17, wherein the plurality of scene change metrics includes a target lane shape, and the machine-readable medium further comprises machine-readable instructions, that when executed by the processor, cause the processors to:

determine the target lane shape; and select between the first trajectory planning process and the second trajectory planning process based on the target lane shape.

19. The machine-readable medium of claim 18, further comprising machine-readable instructions, that when executed by the processors, cause the processor to:

calculate the target lane shape using a following equation:

$$TLS = \max_{s} |l_t(s) - l_0(s)|$$

where:
$l_t(s)$ are coordinates of a lane center trajectory in the current driving scene;
$l_0(s)$ are coordinates of the lane center trajectory in the predicted driving scene; and
s is a station value along a lane segment; and
TLS is the target lane shape.

20. The machine-readable medium of claim 19, further comprising machine-readable instructions, that when executed by the processor, cause the processor to:

determine a sum of weighted scene change metrics is calculated according to a following equation:

$$SWM = w_1 d_i + w_2 GED(g0, g1) + w_3 TLS$$

where:
SWM is the sum of the weighted scene metrics;
$GED(g_0, g_1)$ is the graph edit distance between the first scene-graph and the second scene-graph;
$d_i$ is the Mahalanobis distance between the predicted position of the remote actor i and the current position of the remote actor i;

TLS is the target lane shape;
$w_1$ is a first weighting factor;
$w_2$ is a second weighting factor; and
$w_3$ is a third weighting factor;
wherein the machine-readable medium further comprises machine-readable instructions, that when executed by the processor, cause the processor to:
select the first trajectory planning process in response to determining that the sum of the weighted scene metrics is greater than a predetermined threshold.

* * * * *